Aug. 8, 1944.  J. MacBLANE  2,355,315
UNDERCUTTING TOOL
Filed Sept. 15, 1942  2 Sheets-Sheet 1

Witness:
Burr W. Jones

INVENTOR.
James MacBlane
BY Clinton S. Jones
ATTORNEY

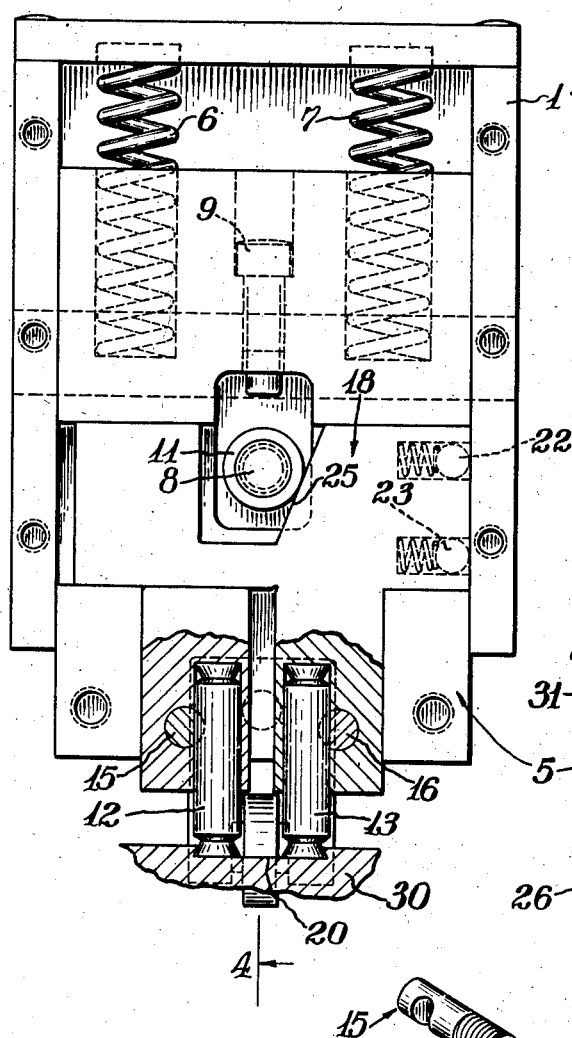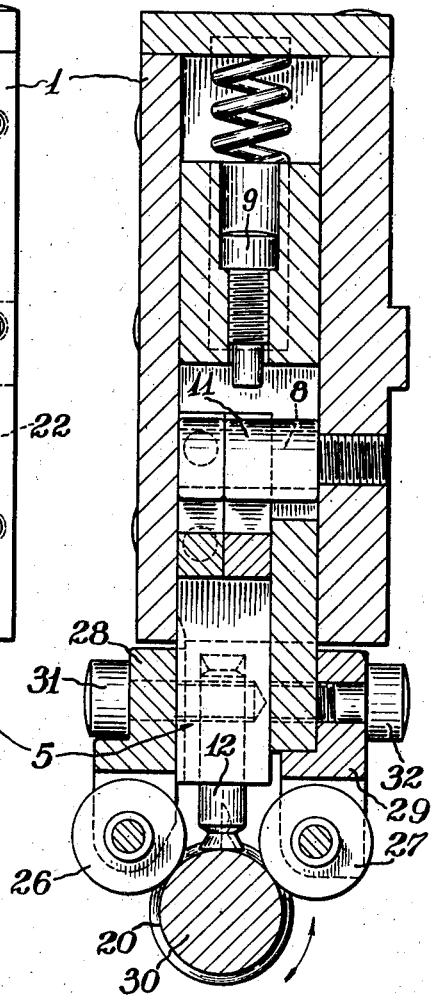

Patented Aug. 8, 1944

2,355,315

UNITED STATES PATENT OFFICE 2,355,315

UNDERCUTTING TOOL

James MacBlane, Elmira Heights, N. Y., assignor to Bendix Aviation Corporation, South Bend, Ind., a corporation of Delaware Application September 15, 1942, Serial No. 458,480

4 Claims. (Cl. 82—11)

The present invention relates to an under-cutting tool for use in automatic machines, and more particularly to a tool for providing a dove-tail circumferential recess in a cylindrical body.

It is an object of the present invention to provide a novel tool for quickly and accurately under-cutting the edges of the groove or recess in a cylindrical work piece.

It is another object to provide such a device which is particularly adapted for use in an automatic machine.

It is another object to provide such a device which is arranged to provide uniformity of cut in spite of small variations in the travel of the tool holder.

It is another object to provide such a device in which the depth of the under-cutting is gauged by the tool holder itself.

It is another object to provide such a device in which both edges of the groove are under-cut simultaneously, the feed pressure of the two cuts being balanced.

Further objects and advantages will be apparent from the following description taken in connection with the accompanying drawings, in which:

Fig. 3 is a front view of the device with the cover plate removed and parts broken away, showing the position of the tools at the end of their work stroke;

Fig. 4 is a section taken substantially on the line 4—4 of Fig. 3; and

Fig. 5 is a detail in perspective of a clamping bolt for a cutting tool.

Figure 1:
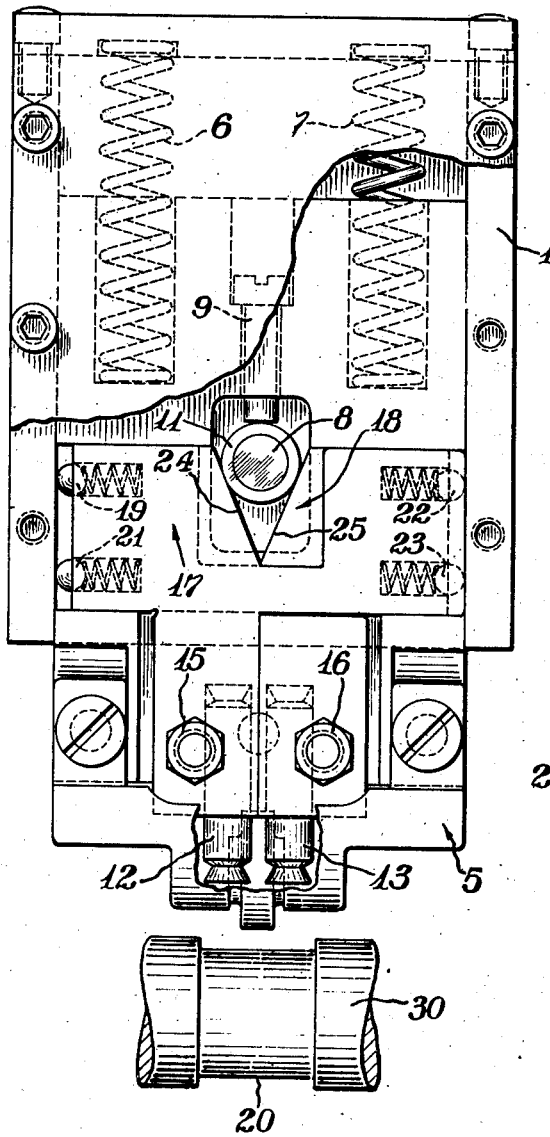
Fig. 1 is a front elevation of a preferred embodiment of the invention with certain parts broken away for the sake of clarity.
Figure 2:
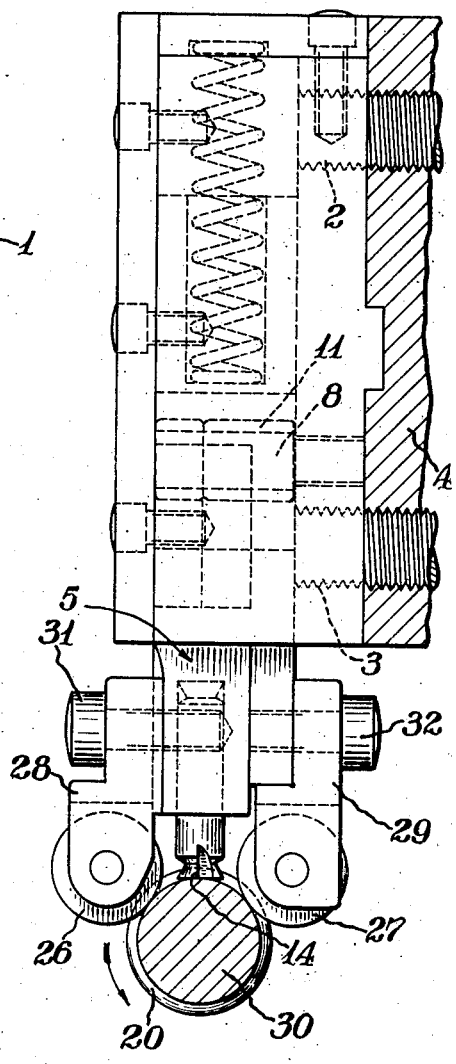
Figure 2 is a side view, partly in section, of the device shown in Fig. 1, showing the tool applied to the work piece.

In Fig. 1 of the drawings there is illustrated a tool holder comprising a frame indicated generally by numeral 1 and having means such as threaded openings 2, 3 for attachment to an operating member 4 of an automatic machine as shown in Fig. 2. A slide 5 is mounted for telescopic movement in the frame 1 and said parts are normally maintained in extended relation by yielding means in the form of a pair of springs 6, 7. The normal position of the slide 5 is defined by an adjustable abutment comprising a stud 8 rigidly mounted in the frame 1, and a bolt 9 threaded in the slide and arranged to engage a sleeve 11 mounted on said stud.

A pair of cutting tools 12 and 13 having suitably formed cutting edges 14 (Fig. 2) are rigidly mounted as by means of clamping bolts 15, 16 in carriers 17, 18 which are mounted with freedom for limited lateral movement in the slide 5. These carriers are formed as best shown in Fig. 3, and are normally maintained in position to cause the cutters 12, 13 to approach each other as shown in Fig. 1 by yielding means such as the spring-pressed balls 19, 21, 22, 23.

According to the present invention, means are provided for moving the cutters longitudinally into contact with the work and then laterally away from each other in order to feed them into the work responsive to a telescopic movement of the slide 5 in the frame 1 against the action of springs 6, 7. As here shown this lateral movement is accomplished by forming inclined cam surfaces 24, 25 on the carriers 17, 18 in position to cooperate with the sleeve 11 on the stud 8 whereby relative longitudinal movement of the carriers with respect to the frame 1 causes the carriers to be cammed apart as shown in Fig. 3.

Means for arresting the longitudinal movement of the slide 5 when the cutters 12, 13 are properly positioned with respect to the work is provided in the form of a pair of rollers 26, 27 carried on brackets 28, 29 fixed to the lower end of the slide as by means of cap screws 31, 32. These rollers are arranged to seat on the bottom of the circumferential recess 20 in the work 30 (Fig. 2), and the cutters are so adjusted as to be fully entered into such groove when the rollers are so seated.

In operation, starting with the parts in idle position as shown in Fig. 1, the work being assumed to be rotating in the direction of the arrow (Fig. 2) longitudinal advancement of the tool carrier toward the work causes the cutters to enter the groove in the work 30 until the travel of the slide 5 is arrested by engagement of rollers 26, 27 with the work as shown in Fig. 2. Further downward movement of the frame 1 causes the sleeve 11 on stud 8 which is rigid with said frame to cam apart the carriers 17, 18, thus causing the cutters 12, 13 to be separated and to engage and under-cut the edges of the groove in the work as it rotates as shown in Fig. 3. During this time the slide 5 with its associated parts is pressed against the work by compression of springs 6, 7.

The depth of the under-cutting is limited by the travel of the carriers 17, 18 in the slide 5 as shown in Fig. 3, so that this operation is maintained uniform regardless of possible slight variations in the travel of the operating mechanism for the tool holder.

When the tool holder is withdrawn, the frame 1 moves upward first, due to the action of springs 6, 7 whereby the cutters 12, 13 are brought together by the compression members 19, 21, 22, 23 as the sleeve 11 is withdrawn from the cam surfaces 24, 25. Further retraction of the frame 1 causes withdrawal of the tool carrier as a unit preparatory to the next operation.

Although but one embodiment of the invention has been shown and described in detail, it will be understood that other embodiments are possible and that various changes may be made in the design and arrangement of the parts without departing from the spirit of the invention as defined in the claims appended hereto.

What is claimed is:

1. An under-cutting tool for an automatic machine including a pair of formed cutters, a holder therefor having means bearing on the work to limit the approach of the holder to the work, and means operative while the holder is so positioned, to move the cutters laterally in opposite directions to effect the under-cutting operation.

2. An under-cutting tool for an automatic machine including a pair of formed cutters, a holder therefor having two telescoping parts and yielding means normally holding said parts extended, the part holding the cutters having means bearing on the work to limit the approach of the cutters to the work, and means operative by the telescopic movement of the holder to move the cutters laterally in opposite directions to effect the under-cutting operation.

3. An under-cutting tool as set forth in claim 2 in which said holder is provided with means to limit the lateral movement of the cutters to gauge thereby the depth of the under-cutting.

4. An automatic machine tool for undercutting grooves on cylindrical bodies comprising a pair of cutters, a holder therefor having two telescoping parts and yielding means normally holding said parts extended, means for advancing the holder till the cutters reach the bottom of the groove in the work, means whereby further advancement of the holder moves the cutters laterally in opposite directions to perform the undercutting operation, and means for retracting the cutters laterally prior to withdrawing them from the work.

JAMES MACBLANE.